United States Patent Office 3,043,828
Patented July 10, 1962

3,043,828
PRODUCTION OF DYESTUFFS
Siegfried Huenig, Marburg (Lahn), Germany, assignor to Badische Anilin- & Soda-Fabrik Aktiengesellschaft, Ludwigshafen (Rhine), Germany
No Drawing. Filed July 1, 1955, Ser. No. 519,674
Claims priority, application Germany July 5, 1954
7 Claims. (Cl. 260—158)

This invention relates to a new process for the production of dyestuffs and also to the new dyestuffs obtainable according to the said process.

It relates in particular to dyestuffs which can be described as azo dyestuffs or as diazacyanine dyestuffs, and to a simple method for their production.

The initial materials for the process are on the one hand hydrazones of heterocyclic ketones of the general formula

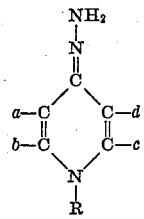

or

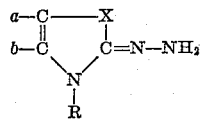

in which $a$, $b$, $c$ and $d$ represent hydrogen, straight-chain or branched alkyl groups with 1 to 4 carbon atoms, aromatic radicals, such as phenyl or tolyl groups, halogen atoms, cyano, nitro, alkoxyl, acyl, carboxyl, ester or sulfonic acid groups, and $a$ and $b$ or also $c$ and $d$ can also be members of condensed alicyclic or aromatic rings which may be substituted by alkyl, alkoxyl, nitro, cyano or acyl groups or halogen atoms; R represents an alkyl, aralkyl or aryl group which also may carry substituents, and X represents a divalent atom, such as oxygen, sulfur or a selenium, or a divalent group, such as $CH_2$, $C(CH_3)_2$, $CH=CH$ or $NCH_3$.

Such hydrazones can be prepared by conventional methods, as for example by reaction of the corresponding ketones with hydrazine (cf. H. Fuchs and A. Grauaug, Berichte der Deutschen Chemischen Gesellschaft 61 (1928), 57, or E. Besthorn, ibid. 43 (1910), 1524).

Suitable hydrazones are thus for example the hydrazones of N-methyl-, N-ethyl-, N-benzyl- and N-phenyl-benzthiazolone-(2), of 5-ethoxy-, -methoxy- or -acetamino- or -nitro-N-methyl-benzthiazolone-(2), or of N-methylbenzoxazolone-(2), of N-methyl-, N-ethyl-, N-benzyl- and N-phenylpyridone-(4) and -(2), of N-ethyl-5-nitropyridone-(2), of N-ethyl- and N-phenylquinolone-(2) and -(4), and of the nitro, chloro and alkoxy derivatives of said quinolones.

According to the present invention heterocyclic hydrazones of the said kinds are reacted in the presence of dehydrogenating or oxidizing agents with organic compounds having reactive hydrogen atoms. In principle all compounds which can be coupled with diazonium salts to form azo dyestuffs are suitable, for example phenols, naphthols, aromatic amines, such as aniline, dimethylaniline, diethylaniline, N-benzylaniline, diphenylamine, the toluidines, anisidines, aminophenols and aminonaphthols, 8-hydroxyquinoline, enols, such as acetyl acetone, acetoacetic acid esters and anilides, dibenzoylmethane, dihydroresorcinol, dimedone, barbituric acids, pyrazolones, rhodanines, eneamines such as aminopyrazoles, and malonodinitrile, N-alkyl-2-phenylindoles and 1,2-dimethylindole.

When using, for example, N-methylbenzthiazolone-(2)-hydrazone and dimethylaniline as initial materials, the reaction may be formulated as follows:

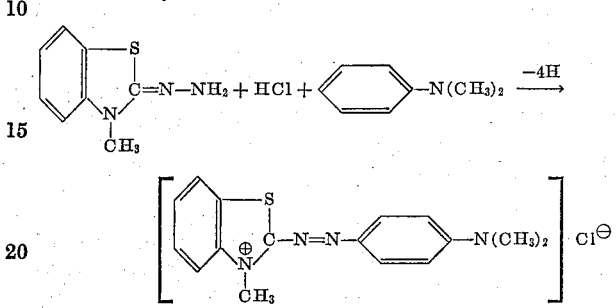

There is thus formed a basic azo or diazacyanine dyestuff.

When using, for example, acetyl acetone enol instead of dimethylaniline, a diazamerocyanine dyestuff is obtained:

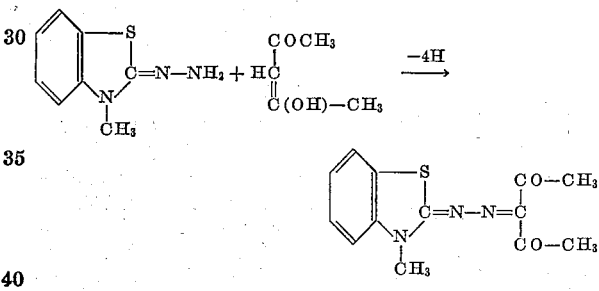

Suitable oxidizing or dehydrogenating agents are for example water soluble ferricyanides, and also ferric salts, cupric salts, mercuric salts, ceric salts, hypochlorites, persulfates, perborates, hydrogen peroxide and elementary oxygen, as for example air, in particular in the presence of oxygen transferrers, such as ferrous, cobaltous and vanadyl salts.

The formation of the dyestuffs can be carried out in acid, neutral or alkaline medium depending on the nature of the components and of the dehydrogenation agent. The oxidative condensation of the hydrazones with phenols, enols and malonitril is usually carried out in an alkaline solution, preferably in diluted ammonia, while the oxidative condensation with eneamines, aromatic amines and indoles is preferably carried out in an acid solution. The most favorable conditions in each case can readily be ascertained by preliminary test. The yields of dyestuffs are excellent in most cases.

The dyestuffs obtainable according to the present invention have yellow, orange, red, violet, blue to blue-green shades of color depending on the nature of the components and are of very great color strength and often of great brilliance. Their solubility or insolubility in water or in organic solvents and their sensitivity to acids or alkali are different in each case. Dyestuffs which contain metallizable components, as for example 8-hydroxyquinoline or N,N-diethylamino-meta-phenoxyacetic acid, may be converted into their complex metal compounds with heavy metal salts.

3

The dyestuffs obtainable according to the present invention are in some cases suitable for dyeing textiles of a greater variety of kinds, in some cases for coloring lacquers or as pigments. They can also be produced directly on the articles to be colored from the components by oxidizing condensation.

The following examples will further illustrate this invention but the invention is not limited to these examples. The parts are parts by weight.

Example 1

9 parts of N-methyl-benzthiazolone-(2)-hydrazone and 9 parts of beta-naphthol are dissolved in 600 parts of methanol and 300 parts of water. While stirring, a solution of 90 parts of potassium ferricyanide in a mixture of 500 parts of methanol, 500 parts of water and 100 parts of 25% ammonia is allowed to flow in slowly. There is immediately precipitated a brown-red precipitate which after dilution with water is filtered off by suction and washed with ammonia water. The yield is 16 parts (=100% of the theoretical yield) of a dyestuff which crystallizes from chlorobenzene in fine red needles melting at 245° to 246° C. The dyestuff is insoluble in ether and water but soluble in alcohols, chloroform, glacial acetic acid and concentrated hydrochloric acid.

The same dyestuff is obtained by using 75 parts of crystallized copper sulfate or 50 parts of silver nitrate as oxidizing agent instead of ferricyanide. The formation of the dyestuff proceeds more slowly and the yields are somewhat less. The dyestuff can be formulated as follows:

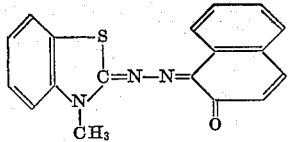

Example 2

The procedure of Example 1 is followed but alpha-naphthol is used as the coupling component. The same yield of a red-brown dyestuff is obtained which crystallizes from amyl alcohol in fine red needles melting at 262° C. This dyestuff is identical with the product obtainable by condensation of N-methylbenzthiazolone-(2)-hydrazone with naphthoquinone-(1,4) in glacial acetic acid and having the formula:

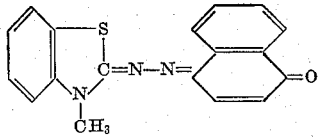

Example 3

5 parts of N-methylbenzthiazolone-(2)-hydrazone and 3.5 parts of phenol are dissolved in 600 parts of 65% methanol. 45 parts of potassium ferricyanide dissolved in a mixture of 500 parts of 50% methanol and 50 parts of concentrated ammonia are allowed to flow into the said solution while stirring. A red dyestuff is immediately precipitated which after dilution with water is filtered off by suction and washed with dilute ammonia solution. The yield is about 90% of the theoretical yield. When recrystallized from amyl alcohol, the dyestuff formed very fine red crystals melting at 229° to 230° C.

The dyestuff is identical with the product obtainable by condensing the hydrazone with para-benzoquinone and having the formula:

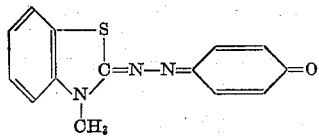

Example 4

5 parts of N-methylbenzthiazolone-(2)-hydrazone and 4 parts of barbituric acid are oxidatively condensed as in Example 3 by the aid of 45 parts of potassium ferricyanide. An orange-yellow dyestuff is obtained in a yield of about 90% of the theoretical yield; after recrystallization from ethyl benzoate it forms small needles melting at 310° to 312° C. and is soluble in alcohols, glacial acetic acid and dilute hydrochloric acid but only slightly soluble in ether, benzene and water. The dyestuff has the formula:

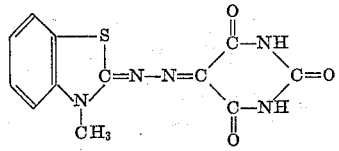

Example 5

5 parts of N-methyl-benzthiazolone-(2)-hydrazone and 5 parts of 1-phenyl-3-methylpyrazolone-(5) are oxidatively condensed as in Example 1 with the aid of potassium ferricyanide. A dyestuff is obtained in a yield of 96% of the theoretical yield which crystallizes from amyl alcohol in brick-red needles melting at 266° to 267° C. The dyestuff has the formula:

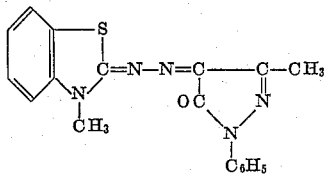

Example 6

10 parts of N-methyl-benzthiazolone-(2)-hydrazone and 3.6 parts of malonodinitrile are dissolved in 600 parts of 65% methanol. A solution of 90 parts of potassium ferricyanide in a mixture of 1000 parts of 50% methanol and 100 parts of concentrated ammonia is allowed to flow in. The yellow dyestuff is immediately precipitated. The yield is 78% of the theoretical yield. When recrystallized from alcohol, the dyestuff forms orange-yellow small needles melting at 235° C. It has the following formula:

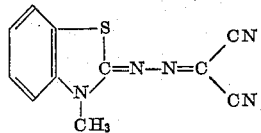

Example 7

1 part of N-methyl-benzthiazolone-(2)-hydrazone and 1 part of acetyl acetone are oxidatively condensed as in Example 6 with the aid of potassium ferricyanide. A yellow dyestuff is obtained in a yield of 80% of the theoretical yield; it has the formula:

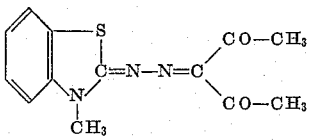

After recrystallization from ethanol, it forms yellow needles melting at 151° C.

Example 8

5 parts of N-methyl-benzthiazolone-(2)-hydrazone and 6 parts of ethylrhodanine are oxidatively condensed as in Example 1 with the aid of potassium ferricyanide. The dyestuff forms in a yield of 95%. When recrystallized from glycol monomethyl ether, it forms orange small needles melting at 295° C. and has the following formula:

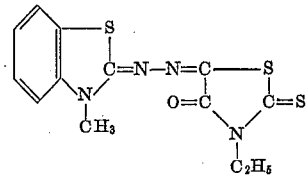

Example 9

To a solution of 22 parts of ortho-cresol in 2000 parts of methanol there are first added 3000 parts of 2-n sodium carbonate solution and then a solution of 50 parts of N-methylpyridone-(4)-hydrazone hydrochloride in 500 parts of water, and then while stirring a solution of 254 parts of potassium ferricyanide in 1000 parts of water is allowed to flow in. A deep purple solution is formed from which 17 parts of a violet powder precipitate after some hours.

The violet dyestuff may be formulated as follows:

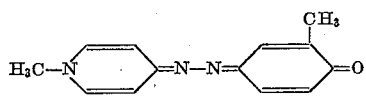

23 parts of the yellow hydroiodide of the same dyestuff can be precipitated from the filtrate by acidification with hydrochloric acid and addition of potassium iodide solution.

Example 10

41 parts of 1-(N,N-diethylamino)-3-hydroxybenzene and 50 parts of N-phenylpyridone-(4)-hydrazone hydrochloride are oxidatively condensed as in Example 9 by the aid of 311 parts of potassium ferricyanide. The dyestuff is precipitated in part from the deep purple solution in small leaflets having a golden glitter. The yield is 56 parts. The mother liquor acidified with hydrochloric acid changes to orange-yellow and yields 30 parts of brownish dyestuff hydrochloride. The free dyestuff may be formulated as follows:

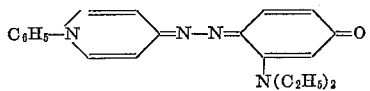

Example 11

31 parts of beta-naphthol and 50 parts of N-ethyl-5-nitropyridone-(2)-hydrazone hydrochloride are oxidatively condensed by the aid of 270 parts of potassium ferricyanide corresponding to Example 9. The dyestuff immediately precipitates as a black-brown crystalline powder. The yield is 68 parts. It is insoluble in water. In methanol it dissolves with a brownish-red coloration which changes to violet upon the addition of caustic soda solution. The dyestuff may be formulated as follows:

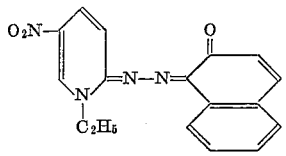

Example 12

31 parts of 8-hydroxyquinoline and 50 parts of N-ethyl-quinoline-(2)-hydrazone hydrochloride are oxidatively condensed by the aid of 266 parts of potassium ferricyanide as in Example 9. The dyestuff precipitates immediately and is filtered off by suction after 15 minutes. 60 parts of a deep red-brown powder are obtained which dissolves in methanol with a vermilion coloration. The solutions become more bluish on the addition of copper or nickel salts. The dyestuff has the formula:

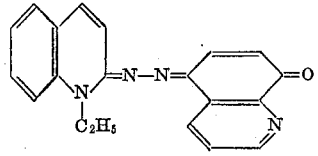

Example 13

A solution of 51 parts of 1-hydroxy-6-aminonaphthalene-3-sulfonic acid in 2500 parts of 2-n sodium carbonate solution is poured into a solution of 50 parts of N-methyl-5-ethoxy-benzthiazolone-(2)-hydrazone in 8000 parts of methanol. A solution of 310 parts of potassium ferricyanide in 1500 parts of water is allowed to flow in, while stirring. After about 20 minutes, the whole is acidified with glacial acetic acid, the dyestuff thereby being immediately precipitated. It is centrifuged off and washed out well with water. 63 parts of a dark green powder having a metallic lustre are obtained which is difficultly soluble in methanol and water but dissolves with a brownish red coloration on the addition of bases. The dyestuff has the following formula:

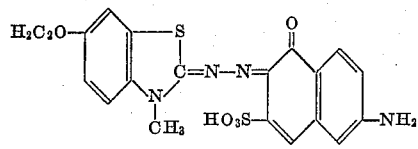

Example 14

The procedure of Example 13 is followed but 79 parts of 1-hydroxy-8-aminonaphthalene-5,7-disulfonic acid are used as coupling component instead of the hydroxyaminonaphthalene sulfonic acid therein used. By working up in the same way there are obtained 84 parts of a dyestuff which dissolves in methanol, especially on the addition of bases, with a violet coloration. The dyestuff has the following formula:

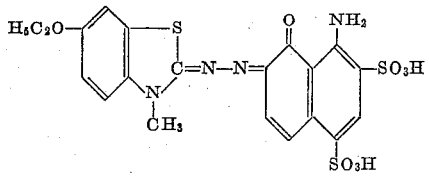

Example 15

5 parts of N-methyl-benzthiazolone-(2)-hydrazone and 5 parts of ortho-toluidine are dissolved in 400 parts of 1-n hydrochloric acid. 100 parts of a 20% aqueous ferric chloride solution are allowed to flow in while stirring at 35° to 40° C. A deep violet solution is immediately formed from which part of the dyestuff salt crystallizes out. After 30 minutes it is diluted with 1500 parts of water in order to dissolve the dyestuff completely and 200 parts of 70% perchloric acid are stirred in. The difficultly soluble perchlorate of the dyestuff is precipitated in fine small needles having a metallic lustre. It is filtered off by suction and washed with water. The yield is 72 parts (=67.5% of the theoretical yield) of the melting point 237.5° to 238.5° C. (from ortho-dichlorobenzene). The dyestuff salt may be formulated as follows:

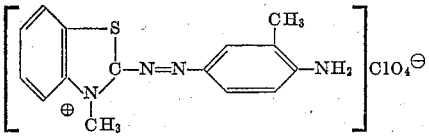

The dyestuff is obtained in a similar way when potassium persulfate, hydrogen peroxide in the presence of ferrous salts, ceric sulfate or potassium permanganate is used as oxidizing agent. With potassium ferricyanide, there is immediately formed the very difficultly soluble ferrocyanide of the dyestuff. With potassium bichromate as the oxidizing agent the dyestuff is preferably formed in neutral, aqueous-alcoholic solution. The solutions of the dyestuff salts yield, upon addition of alkali, as for example ammonia, the yellow-brown dyestuff base melting at 141° C. (after recrystallization from methanol to which ammonia has been added). With acids the dyestuff base reforms the deep colored dyestuff salts.

*Example 16*

To a solution of 5 parts of 6-ethoxy-N-methylbenzthiazolone-(2)-hydrazone and 3.6 parts of 8-hydroxyquinoline in 800 parts of methanol there are added first 500 parts of 1-n sodium carbonate solution and then, while stirring, a solution of 31 parts of potassium ferricyanide in 150 parts of water is gradually allowed to flow in. The violet dyestuff is immediately precipitated. After about 15 minutes, the whole is diluted with 1500 parts of water, weakly acidified with acetic acid and the precipitated dyestuff filtered off by suction and well washed with water.

The yield is 7.2 parts. The dyestuff may be formulated as follows:

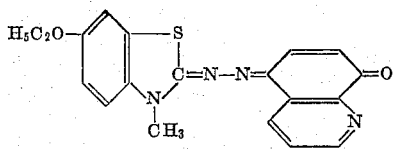

It dissolves difficultly in methanol with a purple color which changes to violet upon the addition of acetic acid and to blue upon the addition of hydrochloric acid. Complex compounds form with a series of heavy metals. Thus the solution in methanol changes upon the addition of copper salts to cold-blue, of nickel salts and cobalt salts to blue and of zinc salts to blue-violet. These colors are stable in acid solution but are destroyed by ammonia (with the exception of the nickel complex) with the reformation of the purple color.

*Example 17*

2.1 parts of 6-methoxy-N-methylbenzthiazolone-(2)-hydrazone and 2.0 parts of 3-di-(β-hydroxy-ethyl)-amino-1-methylbenzene are dissolved in 200 parts of hydrochloric acid (D.=1.017) while heating and this solution is combined with 45 parts of a 20% aqueous solution of ferric chloride at 40° C. while stirring. When the formation of the precipitate has ceased, the mixture is heated until the precipitate has dissolved, filtered and combined with an equal volume of a 20% solution of sodium chloride. The dyestuff is then filtered off by suction after cooling, washed with little water and dried.

A finely crystalline dark powder is obtained which dissolves in hydrophilic organic solvents giving a dark-blue, and in hot water giving a reddish-blue coloration. The color shade of the aqueous solution is not changed by the addition of weak alkalies or acids.

Similar dyestuffs are obtained by using, instead of 3-di-(β-hydroxyethyl-)amino-1-methylbenzene, equivalent amounts of dimethyl aniline, diethylaniline, dibutylaniline, N-ethyl - N - cyanoethylaniline, N,N-diethyl-meta-chloroaniline, N-ethyl-diphenylamine and N,N-diethyl-α- and β-naphthylamines.

*Example 18*

A solution of 2.2 parts of 1-methyl-2-phenylindole in 20 parts of dimethylformamide is poured, while stirring, into a solution of 1.8 parts of N-methylbenzthiazolone-(2)-hydrazone in a mixture of 100 parts of hydrochloric acid (D.=1.017) and 100 parts of methanol. At 50° C. about 40 parts of a 20% aqueous solution of ferric chloride are stirred in until no further intensification of color occurs. By the addition of an aqueous solution of 10 parts of sodium perchlorate the dyestuff formed is precipitated as the perchlorate. It dissolves in aqueous methanol or acetone giving a bluish-red coloration.

A similar, but red dyestuff is obtained if 1,2-dimethylindole is used instead of the 1-methyl-2-phenyl-indole.

Quaternary benzthiazole azo dyestuffs herein disclosed have the general formula

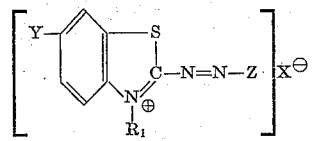

wherein $R_1$ represents a member of the group consisting of methyl, ethyl, benzyl and phenyl, Y represents a member from the group consisting of hydrogen, methoxy, ethoxy, nitro and acetamino groups, Z represents a radical of a member of the group consisting of amines of the benzene and naphthalene series, and X represents an anion, e.g., of chloride, bromide, iodide, perchlorate and methosulfate ions.

The group Z in the above formula, which represents the amines of the benzene and naphthalene series, is derived from the aromatic amines, e.g., aniline, dimethyl-aniline, N-benzyl aniline, diphenylamine, toluidines, anisidines, 3 - (di-β-hydroxyethyl)-amino-1-methyl-benzene, diethyl aniline, dibutylaniline, N-ethyl-N-cyanoethylaniline, N,N-diethyl-meta-chloroaniline, N-ethyldiphenylamine, and N,N-diethyl-α and β-naphthylamines. The group Z, accordingly, may be further characterized by one of the formulae

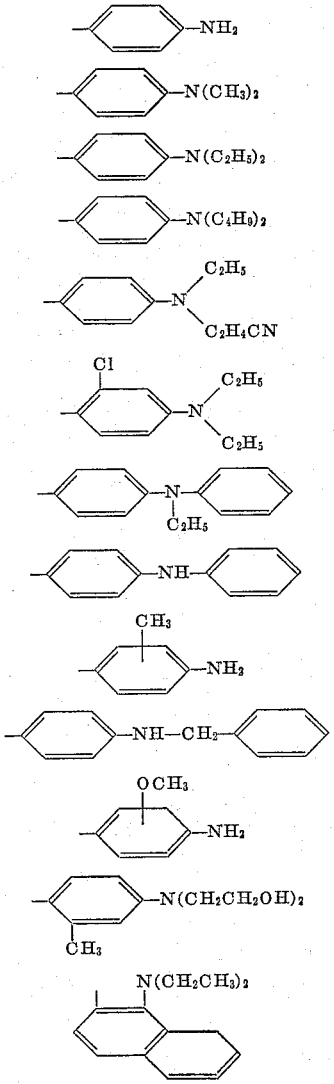

and

[naphthalene with N(CH₂CH₃)₂]

I claim:
1. A dyestuff of the formula

$$\left[ \begin{array}{c} Y\text{-benzothiazole-}C\text{-}N=N\text{-}Z \\ N^{\oplus}\text{-}CH_3 \end{array} \right] X^{\ominus}$$

in which Y is selected from the class consisting of hydrogen, methoxy, ethoxy, acetamino, and nitro, X is an anion, and Z represents a member selected from the class consisting of groups of the formulae

—⟨ ⟩—NH₂

—⟨ ⟩—N(CH₃)₂

—⟨ ⟩—N(C₂H₅)₂

—⟨ ⟩—N(C₄H₉)₂

—⟨ ⟩—N(C₂H₅)(C₂H₄CN)

—⟨ ⟩(Cl)—N(C₂H₅)(C₂H₅)

—⟨ ⟩—N(phenyl)(C₂H₅)

—⟨ ⟩—NH—⟨ ⟩

—⟨ ⟩(CH₃)—NH₂

—⟨ ⟩—NH—CH₂—⟨ ⟩

—⟨ ⟩(OCH₃)—NH₂

—⟨ ⟩(CH₃)—N(CH₂CH₂OH)₂

[naphthalene with N(CH₂CH₃)₂]

and

[naphthalene with N(CH₂CH₃)₂]

2. A dyestuff of the formula $$\left[ \begin{array}{c} R_1 \\ \text{benzothiazole-}C\text{-}N=N\text{-}\langle\text{phenyl}\rangle\text{-}N(R_2)(R_3) \end{array} \right]^{\oplus} X^{\ominus}$$

wherein R₁ is a member selected from the group consisting of lower alkyl and benzyl radicals, R₂ is a member selected from the group consisting of hydrogen, lower alkyl, phenyl and benzyl radicals, R₃ is a lower alkyl radical and X represents an anion.

3. The dyestuff of the formula $$\left[ H_3CO\text{-benzothiazole-}C\text{-}N=N\text{-}\langle\text{phenyl}\rangle\text{-}N(CH_3)_2 \right] Cl^{\ominus}$$

4. The dyestuff of the formula $$\left[ \text{benzothiazole-}C\text{-}N=N\text{-}\langle\text{phenyl(CH}_3)\rangle\text{-}NH_2 \right] ClO_4^{\ominus}$$

5. The dyestuff of the formula $$\left[ H_3CO\text{-benzothiazole-}C\text{-}N=N\text{-}\langle\text{phenyl}\rangle\text{-}N(\text{phenyl})(C_2H_5) \right] Cl^{\ominus}$$

6. The dyestuff of the formula $$\left[ CH_3O\text{-benzothiazole-}C\text{-}N=N\text{-}\langle\text{phenyl(CH}_3)\rangle\text{-}N(CH_2CH_2OH)_2 \right] Cl^{\ominus}$$

7. The dyestuff of the formula $$\left[ \text{benzothiazole-}C\text{-}N=N\text{-}\langle\text{phenyl}\rangle\text{-}N(CH_3)_2 \right] Cl^{\ominus}$$

References Cited in the file of this patent
UNITED STATES PATENTS

| | | |
|---|---|---|
| 2,149,051 | Helberger et al. | Feb. 28, 1939 |
| 2,312,040 | Kendall et al. | Feb. 23, 1943 |
| 2,396,145 | Askelof et al. | Mar. 5, 1946 |
| 2,441,612 | Argyle et al. | May 18, 1948 |
| 2,464,785 | Thompson | Mar. 22, 1949 |
| 2,832,764 | Huenig | Apr. 29, 1958 |
| 2,864,813 | Bossard et al. | Dec. 16, 1958 |

OTHER REFERENCES

Chemisches Zentralblatt, vol. 126, 1955, page 8154.
Kiprianov et al.: "Ukrainian Chemical Journal," vol. 15, pages 460–466, 1949. (Avialable in Div. 38.)
Fuchs: Ber. Deut. Chem., vol. 61, 1928, pages 59–62. (Copy in Library.)

UNITED STATES PATENT OFFICE
CERTIFICATE OF CORRECTION

Patent No. 3,043,828                               July 10, 1962

Siegfried Huenig

It is hereby certified that error appears in the above numbered patent requiring correction and that the said Letters Patent should read as corrected below.

Column 6, lines 25 to 31, the formula should appear as shown below instead of as in the patent:

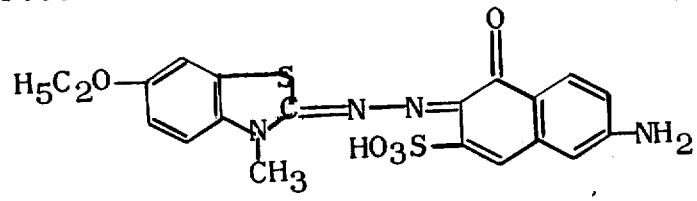

Signed and sealed this 20th day of November 1962.

(SEAL)
Attest:

ERNEST W. SWIDER
Attesting Officer

DAVID L. LADD
Commissioner of Patents